(12) United States Patent
Rifkin (10) Patent No.: US 7,475,013 B2
(45) Date of Patent: Jan. 6, 2009

(54) SPEAKER RECOGNITION USING LOCAL MODELS

(75) Inventor: Ryan Rifkin, Boston, MA (US)

(73) Assignee: Honda Motor Co., Ltd., Tokyo (JP)

( * ) Notice: Subject to any disclaimer, the term of this patent is extended or adjusted under 35 U.S.C. 154(b) by 832 days.

(21) Appl. No.: 10/810,232

(22) Filed: Mar. 26, 2004

(65) Prior Publication Data

US 2004/0225498 A1 Nov. 11, 2004

Related U.S. Application Data

(60) Provisional application No. 60/458,285, filed on Mar. 26, 2003.

(51) Int. Cl.
*G06K 9/36* (2006.01)
*G06K 9/62* (2006.01)
*G10L 15/00* (2006.01)
*G10L 15/06* (2006.01)

(52) U.S. Cl. .................. 704/238; 382/215; 382/286; 704/231; 704/239; 704/245

(58) Field of Classification Search .............. 704/245, 704/238
See application file for complete search history.

(56) References Cited

U.S. PATENT DOCUMENTS

| 5,271,088 | A | 12/1993 | Bahler |
| 5,414,755 | A | 5/1995 | Bahler |
| 6,081,803 | A * | 6/2000 | Ashby et al. .................. 707/4 |
| 6,539,351 | B1 | 3/2003 | Chen et al. |

OTHER PUBLICATIONS

Arya et al., "An Optical Algorithm For Approximated Nearest Neighbor Searching In Fixed Dimensions," Journal of the ACM, vol. 45, No. 6, Nov. 1998, pp. 891-923.
International Search Report and Written Opinion, PCT/US2004/09539; Jun. 27, 2006.
Pellom et al., "An Efficient Scoring Algorithm For Gaussian Mixture Model Based Speaker Identification," IEEE signal processing letters, vol. 5, 1998, pp. 281-284.
Douglas A. Reynolds, "Automatic speaker recognition using gaussian mixture models," *The Lincoln Laboratory Journal*, vol. 8, No. 2, pp. 173-912, 1975.

(Continued)

*Primary Examiner*—David R. Hudspeth
*Assistant Examiner*—Justin W Rider
(74) *Attorney, Agent, or Firm*—Fenwick & West; Mark Duell (57) ABSTRACT

A system and method for voice recognition is disclosed. The system enrolls speakers using an enrollment voice samples and identification information. An extraction module characterizes enrollment voice samples with high-dimensional feature vectors or speaker data points. A data structuring module organizes data points into a high-dimensional data structure, such as a kd-tree, in which similarity between data points dictates a distance, such as a Euclidean distance, a Minkowski distance, or a Manhattan distance. The system recognizes a speaker using an unidentified voice sample. A data querying module searches the data structure to generate a subset of approximate nearest neighbors based on an extracted high-dimensional feature vector. A data modeling module uses Parzen windows to estimate a probability density function representing how closely characteristics of the unidentified speaker match enrolled speakers, in real-time, without extensive training data or parametric assumptions about data distribution.

37 Claims, 5 Drawing Sheets

OTHER PUBLICATIONS

Kevin R. Farrell, Richard J. Mammone, and Khaled T. Assaleh, "Speaker recognition using neural networks and conventional classifiers," *IEEE Transactions on Speech and Audio Processing*, vol. 2, No. 1, pp. 194-205, 1994.

Nathan Smith and Mahesan Niranjan, "Data-dependant kernels in SVM classification of speech patterns," Tech. Rep. CUED/FINFENG/TR.387, Cambridge University Engineering Department, 2001, 4 pages.

William M. Campbell and Khaled T. Assaleh, "Polynomial classifier techniques for speaker verification," in *Proceedings of the International Conference on Acoustics, Speech, and Signal Processing*, 1999, pp. 321-324.

William M. Campbell, "Generalized linear discriminant sequence kernels for speaker recognition," in *Proceedings of the International Conference on Acoustics, Speech, and Signal Processing*, 2002.

E. Parzen, "On estimation of a probability density function and mode," *Annals of Mathematical Statistics*, vol. 33, pp. 1065-1076, 1762.

Vladimir N. Vapnik, *Statistical Learning Theory*, John Wiley & Sons, 1998, pp. 308-315; 401-412; 421-425; 430-434; 484-496.

Ryan M. Rifkin, *Everything Old Is New Again: A Fresh Look at Historical Approaches to Machine Learning*, Ph.D. thesis, Massachusetts Institute of Technology, 2002.

Micheal E. Tipping, "Sparse Bayesian learning and the relevance vector machine," *Journal of Machine Learning Research*, vol. 1, pp. 211-244, 2001.

Jerome H. Friedman, Jon Louis Bentley, and Raphael A. Finkel, "An algorithm for finding best matches in logarithmic expected time," *ACM Transactions on Mathematical Software*, vol. 3, No. 3, pp. 209-226, 1977.

A. C. Yao and F.F. Yao, "A general approach to d-dimensional geometric queries," in *Proceedings of the 17th Annual ACM Symposium on the Theory of Computing*, 1985, pp. 163-168.

K. L. Clarkson, "A randomized algorithm for closest-point queries," *Siam Journal on Computing*, vol. 17, No. 4, pp. 830-847, 1988.

S. Meiser, "Point location in arrangements of hyperplanes," *Information and Computation*, vol. 106, No. 2, pp. 286-303, 1993.

R. L. Sproull, "Refinements to nearest-neighbor searching in k-dimensional trees," *Algorithmica*, vol. 6, pp. 579-589, 1991.

P. Indyk and R. Motwani, "Approximate nearest neighbors: towards removing the curse of dimensionality," in *Proceedings of the 30th Annual ACM Symposium on the Theory of Computing*, 1998, pp. 604-613.

Eyal Kushilevitz, Rafael Ostrovsky, and Yuval Rabani, "Efficient search for approximate nearest neighbors in high dimensional spaces," in *Proceedings of the 30th Annual ACM Symposium on the Theory of Computing*, 1998, pp. 614-623.

Sunil Arya, David M. Mount, Nathan S. Netanyahu, Ruth Silverman, and Angela Y. Wu, "An optimal algorithm for approximate nearest neighbor searching in fixed dimensions," *Journal of the ACM*, vol. 45, pp. 891-923, 1998.

David M. Mount, and S. Arya, "ANN: A Library for Approximate Nearest Neighbor Searching," 2nd Annual Fall Workshop on Computational Geometry (submitted) Sep. 10, 1997.

George R. Doddington, Mark A. Przybocki, Alvin F. Martin, and Douglas A. Reynolds, "The NIST speaker recognition evaluation—overview, methodology, systems, results, perspective," *Speech Communication*, vol. 31, No. 2-3, pp. 225-254, 2000.

Leon Bottou and Vladimir Vapnik, "Local learning algorithms," *Neural Computation*, vol. 4, pp. 888-900, 1992.

V. Vapnik and L. Bottou, "Local algorithms for pattern recognition and dependencies estimation," *Neural Computation*, vol. 5, pp. 893-909, 1993.

David M. Mount, "ANN: A Library for Approximate Nearest Neighbor Searching," Version 0.2 (Beta release) online at http://www.cs.umd.edu/~mount/ANN/ (Jun. 24, 1998).

* cited by examiner

SPEAKER RECOGNITION USING LOCAL MODELS

CROSS REFERENCE TO RELATED APPLICATIONS

This application is related to U.S. Provisional Patent Application No. 60/458,285, filed on Mar. 26, 2003, entitled "Speaker Recognition Using Local Models," by Ryan Rifkin, from which priority is claimed under 35 U.S.C. § 119(e) and the entire contents of which are herein incorporated by reference.

BACKGROUND OF THE INVENTION

1. Field of the Invention

This invention pertains generally to speaker recognition, and more particularly, to a system and method for recognizing a speaker with an estimated density of data points located, in a data structure, closest to a data point from the speaker.

2. Description of Related Art

Advancements in speaker recognition bring applications of human-computer interaction further into our everyday lives. Such artificial intelligence enables, for example, voice instructions to a robot, hands free productivity in a vehicle, and biometric security features. Even more, text-independent speaker recognition identifies speakers without relying on predetermined utterances such as a password. For example, a speaker enrolls by pronouncing an utterance of letters, and is recognized by pronouncing an utterance of numbers. On the other hand, text-dependent systems use the same utterance and make comparisons on similar portions of the two utterances (e.g., same letter of the alphabet).

A difficulty presented by text-independent voice recognition is that significant amounts of information must be collected from each voice sample in order to provide a basis for reliable comparison. An application having a large number of registered speakers must be outfitted with a large and complex database and a high-end processing system to perform comparisons. Many of the current voice recognition techniques are problematic in this environment in that they cannot handle large data sets quickly enough or they take shortcuts by making inaccurate assumptions about the data.

Parametric (or generative) approaches to speaker recognition are too restrictive and inaccurate for real-world data distributions. Methods such as Gaussian Mixed Models assume Gaussian distributions in order to reduce the amount of computations necessary for making an identification. However, data distribution properties change over time, and are, consequently, not always amenable to such assumptions. Thus, parametric approaches do not provide sufficient accuracy for many applications of voice recognition.

Discriminative approaches to speaker recognition, although highly accurate, are not trainable for large data sets. Support vector machines, polynomial regression classifiers, relevance vector machines, regularized least-squares classification, for example, use classifiers rather than parametric assumptions. Additionally, many discriminative approaches exhibit sparsity and other properties, making them computationally efficient by reducing the number of classifiers needed to make a comparison. Nevertheless, discriminative approaches are not scalable to large data sets (e.g., 500,000 or 1,000,000 data points) since training complexity can be quadratic to the number of data points. Because voice recognition performs pattern recognition of rich, high-dimensional data points, many nonparametric approaches are not tractable. Other nonparametric approaches require unacceptable computation time. Each test data point is compared against every training point causing test time to increase linearly with the amount of training data points.

Accordingly, there is a need for a robust voice recognition system and method that maintains accuracy and computational efficiency in environments with large and feature rich data sets. During enrollment of a speaker, the solution should efficiently organize a speaker data structure such that, during recognition of an unidentified speaker, it can quickly produce a subset of speaker data points to use in reliably estimating a density function for identification.

SUMMARY OF THE INVENTION

The present invention provides a system and method for voice recognition to meet the above needs. Advantageously, the voice recognition system is fast, tractable and reliable for large, feature rich data sets. In one embodiment, the system organizes a voice sample from an enrolled speaker into a data structure adapted for approximate nearest neighbor searching. Given a voice sample from an unidentified speaker, the system searches the data structure for a subset of closest speaker data points to formulate an estimated density.

In another embodiment, the system enrolls a speaker using an enrollment voice sample and identification information. An extraction module characterizes the enrollment voice sample with one or more high-dimensional feature vectors or speaker data points. A data structuring module organizes data points into a high-dimensional data structure, such as a kd-tree, in which similarity between individual data points dictates a distance, such as a Euclidean distance, a Minkowski distance, or a Manhattan distance. As a result, the data structure quickly reports distances between a subsequent data point from an unidentified speaker and data points from enrolled speakers.

In yet another embodiment, the system identifies a speaker using an unidentified voice sample. A data querying module searches the data structure to generate a subset of approximate nearest neighbors based on a high-dimensional feature vector or data point from an unidentified speaker. A data modeling module estimates a probability density function representing how closely characteristics of the unidentified speaker match enrolled speakers. One embodiment of the data modeling module uses kernel regression, such as Parzen windows, to produce the estimated density from the subset of approximate nearest neighbors. Another embodiment of the data modeling module estimates a local density in real-time, without extensive modeling data points or parametric assumptions about data distribution. A smoothing parameter controls the relative contributions of close and far speaker data points to the estimated density.

In still another embodiment, an identification module computes a score derived from the estimated density. One embodiment of the identification module accumulates scores for each enrollment speaker associated with the subset of speaker data points. The identification module outputs an identity of the enrollment speaker with the highest score to an output device, such as a robot or ATM machine, to apply a set of business rules. Another embodiment of the identification module outputs the identification under that condition that it remains within an error threshold.

DETAILED DESCRIPTION OF THE PREFERRED EMBODIMENTS

A system and method for voice recognition is disclosed. One embodiment of the system is set forth in FIGS. 1-3, and one embodiment of the method operating therein is set forth in FIGS. 4-6. The accompanying description is for the purpose of providing a thorough explanation with numerous specific details. Of course, the field of voice recognition is such that many different variations of the illustrated and described features of the invention are possible. Those skilled in the art will thus undoubtedly appreciate that the invention can be practiced without some specific details described below, and indeed will see that many other variations and embodiments of the invention can be practiced while still satisfying its teachings and spirit. Accordingly, the present invention should not be understood as being limited to the specific implementations described below, but only by the claims that follow.

The processes, features, or functions of the present invention can be implemented by program instructions that execute in an appropriate computing device. Example computing devices include enterprise servers, application servers, workstations, personal computers, network computers, network appliances, personal digital assistants, game consoles, televisions, set-top boxes, premises automation equipment, point-of-sale terminals, automobiles, and personal communications devices (e.g., cellular handsets).

The program instructions can be distributed on a computer readable medium or storage volume. The computer readable storage volume can be available via a public network, a private network, or the Internet. Program instructions can be in any appropriate form, such as source code, object code, or scripting code.

Figure 1:
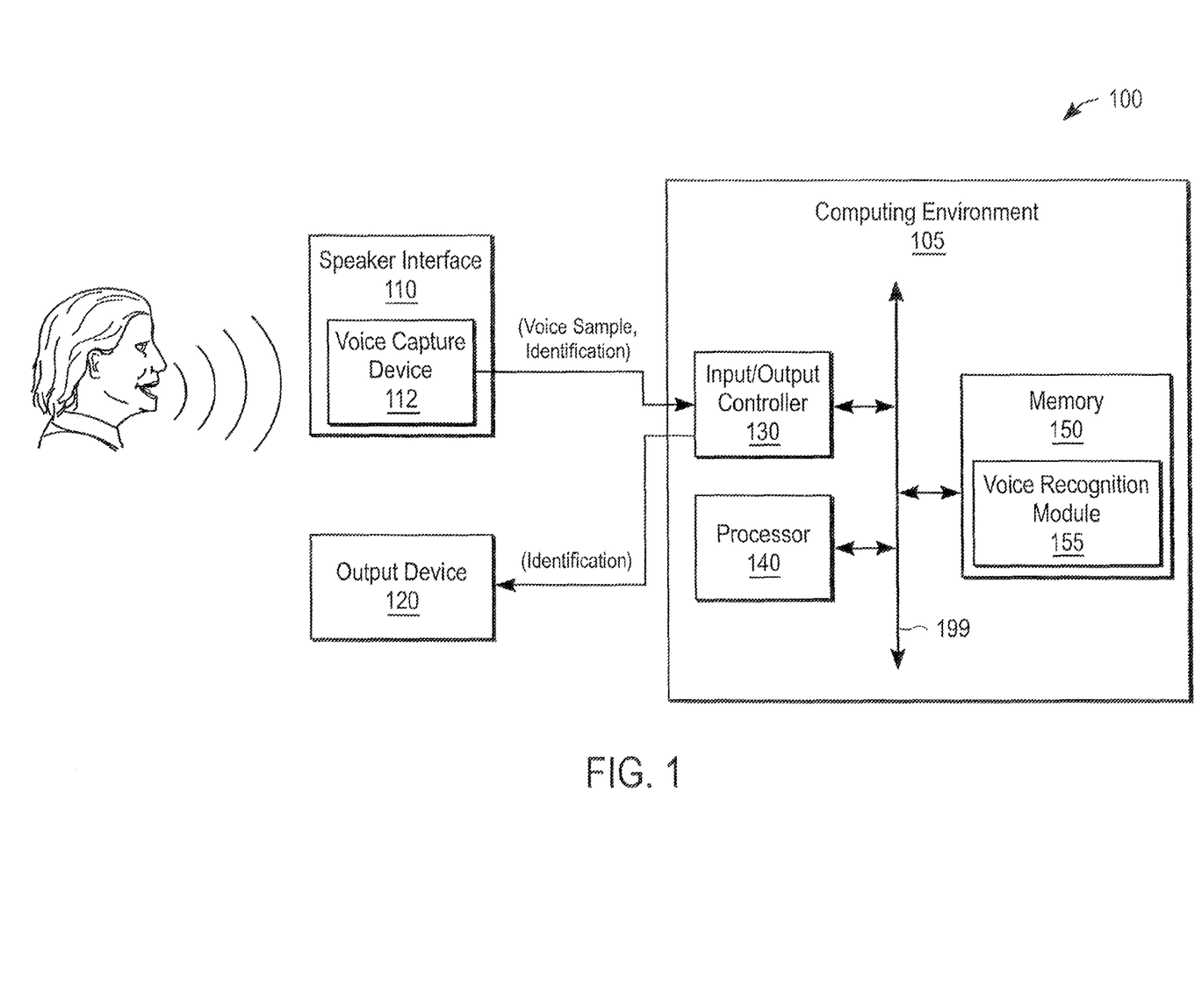
FIG. 1 is a block diagram illustrating a system for voice recognition according to one embodiment of the present invention.

FIG. 1 is a block diagram illustrating a system 100 for voice recognition according to one embodiment of the present invention. The system 100 can be embodied in, for example an automobile, a robot, a verification or security system, or the like. The system 100 comprises a computing environment 105 coupled to a speaker interface 110 and an output device 120. Generally, the speaker interface 110 sends voice samples of a speaker to the computing environment 105 for enrollment or recognition. During recognition, if the computing environment 105 outputs an identification if it matches a recognition voice sample with an enrollment voice sample. As used herein, the term "voice sample" refers to one or more words or partial words, phrases, numbers, codes, or any other vocal projection or utterance, of any language or dialect, by the speaker. A "feature vector," such as a voice print or speaker data point, refers to characteristics of the voice sample as indicated by metrics in the time or frequency domain, biometrics, statistics, and the like. Methods operating with the system 100 are described in further detail below.

The speaker interface 110 includes a voice capture device 112, such as a microphone, to receive voice samples from speakers. The speaker interface 110 can generate the voice sample as an audio signal from a speaker by digitizing analog sound, receiving already digitized sound, or editing the sound (e.g., clipping or volume normalizing). In one embodiment the voice sample is a digital voice file stored in a format such as WAV, MP3, AAC, MIDI, WMA, or any other format useable by the computing environment 105. The speaker interface 110 can include, for example, a keyboard or number pad for a speaker to input identification information. The speaker interface 110 transmits the voice sample by, for example, representative electrical or bit signals through a bus, circuit, a wire, a telephone line, or a network. The speaker interface 110 can be embodied in, for example, a cell phone, a land-line telephone, an IP telephony device, a microphone, or any other device capable of receiving voice samples from the speaker. The voice capture device 112, in one embodiment, is an accessory that is unaware of the remaining system 100, and in another embodiment, is integrated and/or specially designed for the system 100.

The computing environment 105 receives voice samples from the voice input device 110 and sends identification information (or imposter information) to the output device 120. Note that the computing environment 105 may be a separate device such as a computer, or integrated into a host environment such as a robot or a vehicle. While the computing environment 105 and its components may be optimized for voice recognition, they may also be used for other computing tasks.

The computing environment 105 further comprises an input/output controller 130, a processor 140, and a memory 150, each of which is coupled to a bus 199. The input/output controller 130 receives voice samples from the voice capture device 112 for processing and sends identification data (or imposter data) to the output device 120. The processor 140 comprises, for example, a CPU, such a Pentium 4 by Intel Corp. of Santa Clara, Calif., an Athlon XP by Advanced Micro Devices, Inc. of Sunnyvale, Calif., an ASIC, an FPGA, or any device capable of executing and manipulating voice recognition instructions and data. The memory 150 comprises a system of volatile and/or non-volatile storage such as RAM, hard drives, buffers and caches, to provide temporary and/or long-term storage of instructions and data. In the embodiment of FIG. 1, the memory 150 further comprises a voice recognition module 155, which enrolls and recognizes speakers using voice samples.

Note that the described components can be implemented in hardware, in software executing within hardware, or a combination of both. Furthermore, the computing environment 105 can include other components such as an operating system, a BIOS, a user interface, etc.

Figure 2:
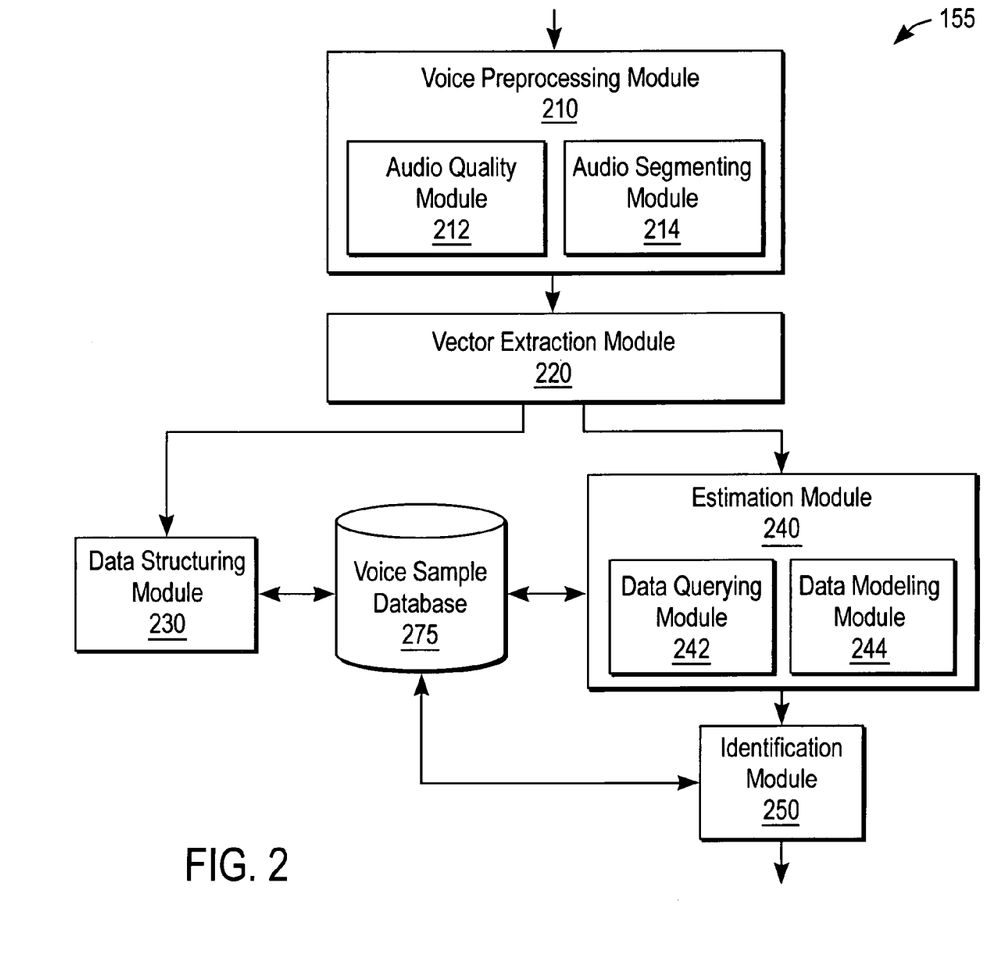
FIG. 2 is a block diagram illustrating the voice recognition module according to one embodiment of the present invention.
Figure 3:
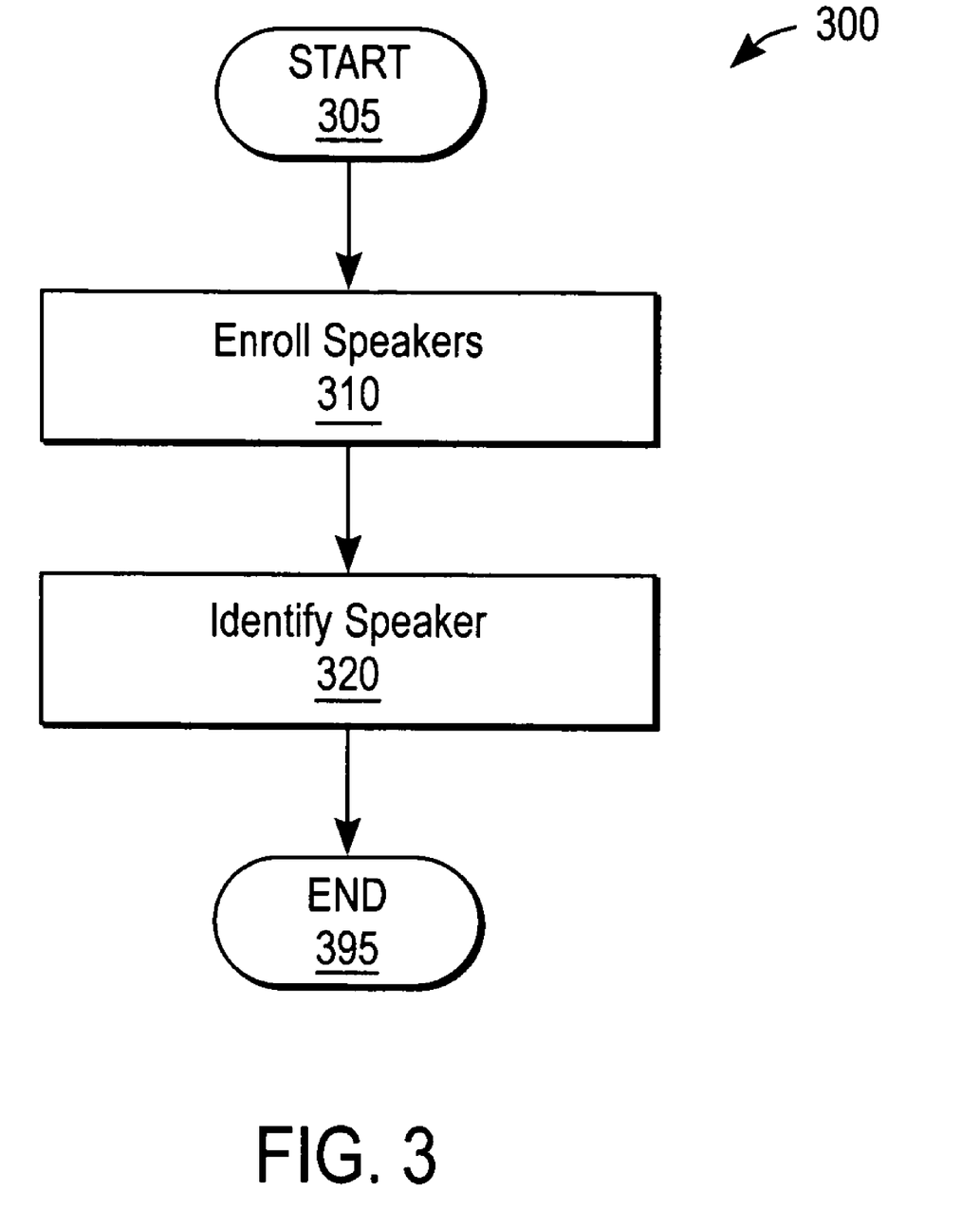
FIG. 3 is a flow chart illustrating a method of recognizing unidentified speakers according to one embodiment of the present invention.
Figure 4:
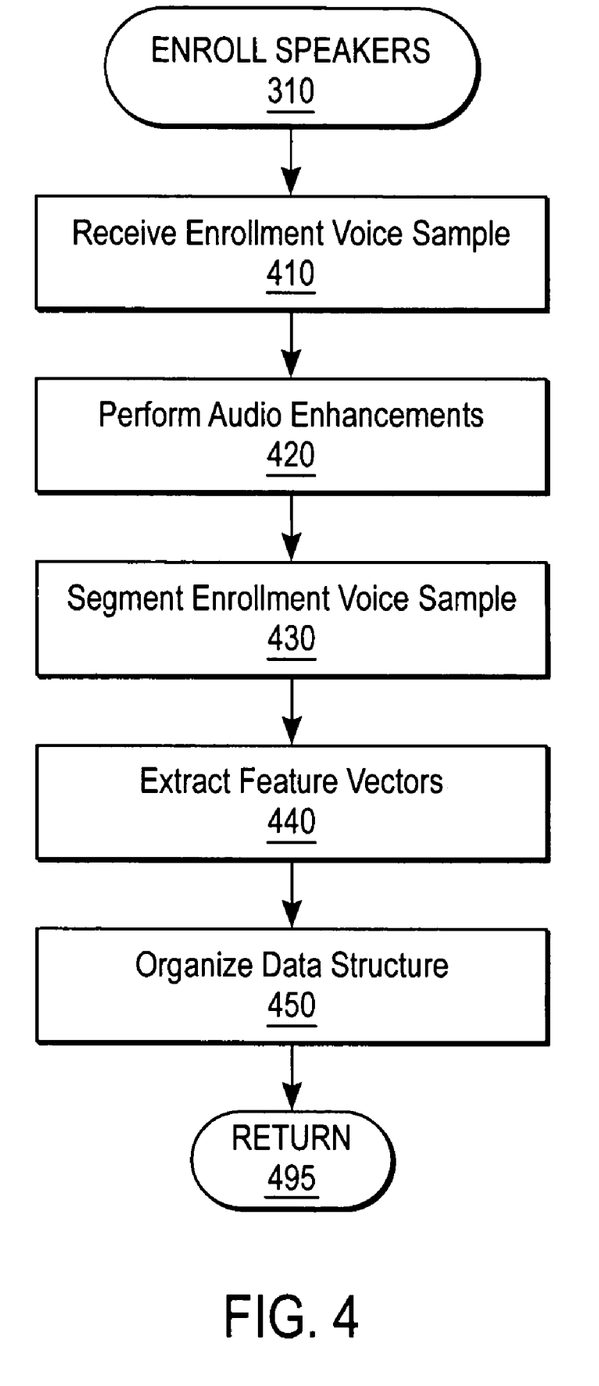
FIG. 4 is a flow chart illustrating the method of enrolling speakers according to one embodiment of the present invention.
Figure 5:
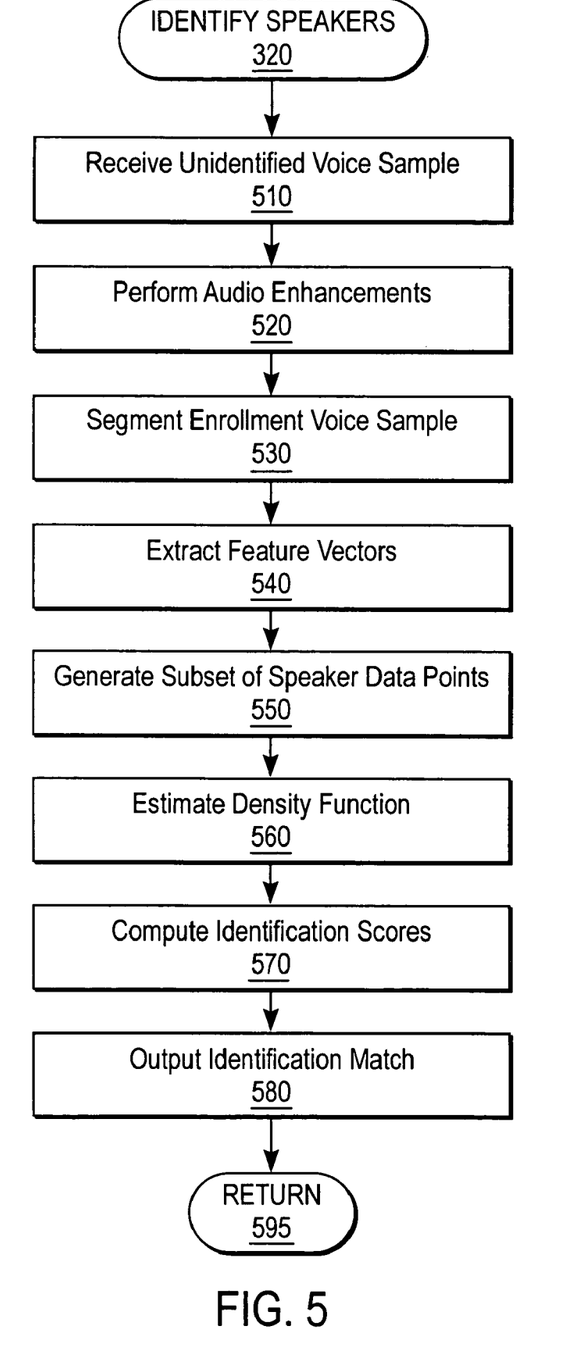
FIG. 5 is a flow chart illustrating the method of identifying a speaker according to one embodiment of the present invention.

FIG. 2 is a block diagram illustrating the voice recognition module 155 according to one embodiment of the present invention. The voice recognition module 155 comprises a voice preprocessing module 210, a vector extraction module 220, a data partitioning module 230, a data querying module 240, a data modeling module 250, and an identification module 260. One of ordinary skill in the art will recognize that variations of the example shown in FIG. 2, such as those disclosed with respect to FIGS. 3-5, are within the scope and spirit of the present invention. For example, modules are used to represent certain groups of functionality, but such modules need not be named, configured, or coupled exactly as shown. Furthermore, the voice recognition module 155 can include additional components such as an audio buffer, a user interface module, or the like.

The voice preprocessing module 210 prepares voice samples for analysis. The voice preprocessing module 210 comprises an audio quality module 212 to perform audio enhancements, such as speech isolation, equalizing, and amplitude leveling, leading to better system 100 performance. The voice preprocessing module 210 further comprises an audio segmenting module 214 to segment the voice sample into several individual frames with a duration according to design parameters. The voice preprocessing module 210 forwards frames in real-time or with a delay, depending on system capabilities. The vector extraction module 210 extracts a rich feature vector representing characteristics, such as cepstral features, of the voice sample as a whole or on a per frame basis.

During enrollment, the data structuring module 230 uses an enrollment feature vector for mapping the feature vector into a data structure stored in the voice sample database 275. The data structure can be partitioned with hyperplanes of Euclidean space that organizes speaker data points for fast retrieval of approximate nearest neighbors. That is, when given a test data point, such as a feature vector derived from an unknown voice sample, the voice sample database 275 preprocessing allows it to quickly determine distances between the test point and other speaker data points.

The voice sample database 275 is adapted for a relatively large data structure of rich speaker data points. In one embodiment, a large database is considered to be such because it is infeasible to spend time, linear in size of the data structure, in order to classify new data points. In another embodiment, a large database is characterized by similar performance between discriminative classification and classification via nonparametric density estimation. By way of quantitative example, data structures containing 500,000, 1,000,000, or 2,000,000 speaker data points can be considered large data structures. Note that, however, a voice sample database 275 can be adapted for a large data structure even though it has yet to accumulate a large volume of data points. For example, in some applications, it is now known a priori how many speakers will register with the system 100.

During identification, the estimation module 240 uses an unidentified feature vector to create an estimated statistical model based on localized speaker data points. In doing so, the estimation module 240 includes a data querying module 242 to search the voice sample database 275 for a subset of approximate nearest neighbors associated with an unidentified speaker data point derived from an unidentified voice sample. The estimation module 240 further includes a data modeling module 244 to estimate a probability density function from the subset of approximate nearest neighbors. In one embodiment, the estimation module estimates the probability density function with Parzen windows. In another embodiment, a smoothing component controls the relative contributions of close and far speaker data points to the probability density function. The identification module 250 computes a score, based on the probability density function, representing the likelihood that one or more enrollment speaker data points are associated with an identity matching the unidentified speaker. The estimation module 240 and identification module 250 can produce a result in real-time.

FIG. 3 is a flow chart illustrating a method 300 of recognizing unidentified speakers according to one embodiment of the present invention. At a high-level, the system 100 operates in two modes, enrollment and identification. Note that in the case of an imposter that attempts to be recognized by the system 100, there is no enrollment process with respect to that speaker. In one embodiment, the output device 120 performs a set of actions, such as a business process, as a result of the system 100 recognizing the user.

The system 100 enrolls 310 enrollment speakers using enrollment a voice sample and identification information. The speaker projects one or more voice samples towards the voice capture device 112. The system 100 analyzes characteristics of the voice samples to use as a reference for subsequent identifications of the same speaker. In one embodiment, the system 100 organizes feature vectors extracted from voice samples, or speaker data points, into a data structure that enables fast querying of nearest neighbors. In another embodiment, the system 100 organizes high-dimensional feature vectors into a high-dimensional data structure, such as a kd-tree, in which similarity between vectors dictates a distance in Euclidean space. Since the system 100 sometimes does not retrieve modeling data until receiving an authentication request, it must be able to quickly retrieve speaker data points for use as identification references.

In one embodiment, the enrollment speaker also enters accompanying identification information such as a name or account number, depending on the nature of the system 100. In another embodiment, speakers are indirectly enrolled by enrollment information provided to the computing environment 105 from an outside source such as an external hard drive or a networked database. Additional methods for enrollment are discussed in detail below with respect to FIG. 4.

The system 100 identifies 320 an unidentified speaker using an unidentified voice sample to determine whether the speaker has enrolled. The unidentified speaker projects one or more voice samples towards the voice capture device 112. Using the reference information accumulated during enrollment 310, the system 100 is able to match the unidentified speaker to an enrolled speaker by unique characteristics, such as biometric parameters, of the speaker's voice. In one embodiment, the system 100 maps a feature vector extracted from the unidentified voice sample into the data structure and retrieves a certain number of approximate nearest neighbors for modeling. The number of approximate nearest neighbors is a design parameter selected in light of tradeoffs between speed and accuracy. In another embodiment, the system 100 models data with a Parzen windows-based probability density function that provides control for the relative contributions of close and far points.

In one embodiment, the system 100 assumes that there is a closed set of speakers, and thus, matches the unknown speaker to the closest known speaker. In another embodiment, the system 100 assumes that there is an open set of speakers. The system uses an error threshold to determine whether the unidentified speaker is an enrolled speaker or an imposter. Accordingly, if the match with the closest enrolled speaker is not strong, the system 100 indicates that a match could not be made.

FIG. 4 is a flow chart illustrating the method 310 of enrolling speakers according to one embodiment of the present invention. During enrollment, the voice preprocessing module 210 receives 410 enrollment voice samples from the voice capture device 112. The audio quality module 212 performs 420 audio enhancements on the voice sample. In one example, audio quality module 212 removes silence and other unnecessary or unusable data from the voice sample. Other variations of audio quality improvement (or no improvements at all) can be implemented as desired. The audio segmenting module 214 segments 430 the voice sample into several individual frames. For example, a speaker can provide a 30-second enrollment voice sample by repeating a telephone or PIN number. The 30-second audio file can be segmented into 25-ms frames, or some other duration depending on system 100. The frames are fed to the voice extraction module 220 in real-time or, by using a buffer with a slight delay. For example, 25-ms frames can be output at a rate of 100 frames per second.

The vector extraction module 210 extracts 440 an enrollment feature vector, or enrollment speaker data point, from the frames. The feature vector contains metrics that represent characteristics or patterns of the enrollment speaker's voice sample. For example, the vector extraction module 210 can determine 15 cepstral and 15 delta-cepstral features for each frame. Lower energy cepstral and delta-cepstral can be removed, leaving a 28-dimensional feature vector. In one embodiment, the vector extraction module 210 can output a representative, or average feature vector for an enrollment voice sample. In another embodiment with higher computation ability, the vector extraction module 210 outputs a feature vector for each frame, providing a richer, and more reliable data set.

The data structuring module 230 organizes 450 feature vectors into a nearest neighbor's data structure stored in the voice sample database 275. The data structure comprises, for example, an ANN library or any other data structure providing quick access to a certain number of closest points. For example, the data structure can be a kd-tree, which is a generalized version of a binary tree with higher dimensions. The kd-tree provides an expected performance of O(l) space and O(log l) time to find k nearest neighbor in a data set of "l" speaker data points and fixed dimensionality "d". Since query time and input space display an exponential dependence on "d", providing the approximate nearest neighbors, a subset of the nearest neighbors, maintains practical computation time for the voice recognition module 155. The number of feature vectors organized for each speaker can be, for example, 500, 1,000, or 2,000 per voice sample, with richer feature vectors providing higher accuracy.

In one embodiment, the data structuring module 230 recursively partitions the input space, allowing a search of the entire data set of speaker data points by partitions. One method of partitioning is to create a hierarchical subdivision of space by splitting hyperplanes that are orthogonal to the coordinate axes, or shrinking. Other methods for splitting the input space include kd-tree splitting, sliding-midpoint, minimum-ambiguity, balanced box-decomposition, and the like. Partitions can be limited by various design considerations such as aspect ratios.

FIG. 5 is a flow chart illustrating the method 320 of identifying a speaker according to one embodiment of the present invention. The voice preprocessing module 210 receives 510 unidentified voice samples from the voice capture device 112 as above. The speaker interface 110 may also set a flag within the voice sample, or send a separate indication, that a voice sample is intended for recognition as opposed to enrollment. The audio quality module 212 performs 520 audio enhancements, and the voice segmenting module 214 segments 530 the voice sample as described. The voice extraction module 210 extracts 540 an unidentified feature vector, or unidentified speaker data point from the frames. In the interest of efficiency, the steps of receiving 510 unidentified voice samples, performing 520 audio enhancements, segmenting 530 the voice sample, and extracting 540 feature vectors preferably operate similarly in both enrollment and recognition, using the same devices. However, one or ordinary skill in the art will recognize variations and optimizations, such as providing separate devices for enrollment and recognition.

The data querying module 242 generates 550 a subset of speaker data points that are approximate nearest neighbors of the feature vector. The data querying module 242 uses the unidentified feature vector as an index into a location within the data structure. It is from this location that approximate nearest neighbors are drawn. The exact number of approximate nearest neighbors returned is implemented in light of the tradeoff between reliability and accuracy. In one embodiment, nearest neighbors are selected as a function of a distance from the unidentified feature vector to an absolute nearest neighbor. For example, this absolute distance can be multiplied by a factor of (1+ϵ), and the approximate nearest neighbors are drawn from within the resulting distance. A shown, a configurable value of ϵ controls the subset results. The search time for this embodiment is independent of dimensionality, advantageously allowing fast searches of rich speaker data points.

The data modeling module 244 estimates 560 a probability density function from the subset of approximate nearest neighbors. In one embodiment, the estimation module estimates the probability density function with Parzen windows. The Parzen windows method is accurate for relatively large data sets. Additionally, it is possible to derive finite sample-size bounds on the quality of density estimation similar to the generalization error bounds for Support Vector Machines. The general Parzen windows method produces an estimated density function for "l" data points as shown in (1):

$$\hat{p}(x) = \frac{1}{l} \sum_{i=1}^{l} R(x - x_i) \quad (1)$$

wherein $(x-x_i)$ represents a distance from an unidentified speaker data point to the i-th enrollment data point.

In another embodiment, "R" comprises a regression kernel with a smoothing component as shown in (2):

$$R(x - x_i) = \frac{1}{(2\pi)^{d/2} \sigma^m} \exp\left(-\frac{\|x - x_i\|}{2\sigma^{2m}}\right) \quad (2)$$

where the choice of σ controls the relative contributions of close and far points to the estimated density at the unidentified speaker data point, "x". As σ→0, $R(x-x_i) \to \delta(x-x_i)$, and the estimated density becomes a collection of delta functions located at the enrollment speaker data points. On the other hand, as σ→∞, the estimated density tends to be zero everywhere. In one embodiment, the σ=0.5 for all sizes of the data structure. However, this value is system dependent.

In the Parzen windows technique of the current embodiment, the speaker data points are ordered in increasing distance from x as shown in (3):

$$\|x - x_1\|^2 \leq \|x - x_2\|^2 \leq \ldots \leq \|x - x_l\|^2 \quad (3).$$

Using the subset k of approximate nearest neighbors to speaker data point x and truncating the representation of $\hat{p}(x)$ to k<<l, a modified Parzen windows can be used for faster computations as shown in (4):

$$\hat{p}(x) = \sum_{i=1}^{k} R(x - x_i). \quad (4)$$

The identification module 250 computes 550 a score to determine which nearest neighbors most closely match the unidentified feature vector. The score is based, at least in part, on the estimated density. In one embodiment, the score of a test point x accumulates scores from nearest neighbors of a common enrollment speaker as shown in (5):

$$s(x) = \frac{\sum_{m(i)=m} R(x, x_i)}{\sum_l R(x, x_i)} \quad (5)$$

where m(i) denotes the speaker of which the enrollment data point is associated, and comprises the kernel R as shown in (6):

$$R(x, x_i) = e^{\frac{\|x-x_i\|}{\sigma}}. \quad (6)$$

In other words, the identification module 250 of this embodiment generates a score as a sum of individual frame scores. In another embodiment, a highest individual frame score is determinative. In other embodiments, scores can be post-processed to include other factors, or pattern recognition techniques, that affect the ultimate identity.

The identity module 250 outputs 560 an identity and/or other identification information associated with the highest score. The identity module 250 submits a winning speaker data point to the voice sample database 275 or another database for a look-up of an associated identity and/or other information. For example, the identity module 250 can output a name, account number, further recognition parameters, and the like. The output device 120 uses the output to apply further business rules, such as allowing access, dispensing cash, or performing an command indicated by the voice sample.

The above description is included to illustrate the operation of the preferred embodiments and is not meant to limit the scope of the invention. The scope of the invention is to instead be limited only by the following claims.

I claim:

1. A method of voice recognition, comprising the steps of:
organizing a plurality of speaker data points, representing a plurality of enrollment speakers, into a data structure using high-dimensional vectors that represent characteristics of enrollment voice samples from the enrollment speakers;
estimating a probability density function of a subset of the plurality of speaker data points using Parzen windows, wherein the subset comprises the approximate nearest neighbors to an unidentified voice sample from an unidentified speaker, the subset not including all speaker data points in the plurality of speaker data points, wherein the relative contributions to the density of individual speaker data points within the subset of speaker data points is based on a distance to a speaker data from the unidentified voice sample, wherein the relative contributions of speaker data points at closer distances are greater than the relative contributions of speaker data points at further distances; and
identifying the unidentified speaker based on one or more speaker data points most closely matching the unidentified voice sample as indicated by the estimated probability density function.

2. The method of claim 1, wherein the step of estimating the probability density comprises estimating the density based on a distance between individual speaker data points within the subset of speaker data points.

3. The method of claim 1, wherein the step of estimating the probability density comprises estimating the density of the subset of speaker data points independent of parametric distribution information related to the plurality of speaker data points.

4. The method of claim 1, wherein the data structure module organizes the plurality of speaker data points such that a distance between individual speaker data points is based on characteristic similarities between associated voice samples, the distance measured in terms of one from the group containing: a Euclidean distance, a Minkowski distance, and a Manhattan distance.

5. The method of claim 1, wherein the data structure comprises a kd-tree.

6. The method of claim 1, wherein the plurality of speaker data points comprises a relatively large number of speaker data points.

7. The method of claim 1, further comprising a step of retrieving the subset of speaker data points using an unidentified speaker data point from the unidentified voice sample as an index into the plurality of speaker data points.

8. The method of claim 6, wherein the step of retrieving the subset of speaker data points comprises retrieving approximate nearest neighbors to the unidentified speaker data point, the approximate nearest neighbors comprising speaker data points within a distance calculated as a function of a distance of an absolute nearest neighbor.

9. The method of claim 1, wherein the subset of speaker data points includes more than one speaker data points associated with a common identification, and the step of identifying the unidentified speaker accumulates a score for the common identification.

10. The method of claim 1, further comprising extracting the high-dimensional vectors from the enrollment voice samples and the unidentified voice sample.

11. The method of claim 1, wherein the step of identifying the unidentified speaker comprises identifying the unidentified speaker as one of the enrollment speakers if matching is within an error threshold.

12. The method of claim 1, wherein an enrollment voice sample and the unidentified voice sample of a common speaker are text-independent.

13. A method of voice recognition, comprising the steps of:
retrieving a subset of speaker data points by using an unidentified speaker data point as an index into a data structure comprising a plurality of speaker data points, the subset of speaker data points representing approximate nearest neighbors to the unidentified speaker data, the subset not including all speaker data points in the plurality of speaker data points;
estimating a probability density function from a subset of the plurality of speaker data points using Parzen windows, wherein the relative contributions to the density of individual speaker data points within the subset of speaker data points is based on a distance to a speaker data point from the unidentified speaker data point, wherein the relative contributions of speaker data points at closer distances are greater than the relative contributions of speaker data points at further distances; and
identifying the unidentified speaker based on one or more speaker data points most closely matching the unidentified voice sample as indicated by the probability density function.

14. A voice recognition system, comprising:
  means for organizing a plurality of speaker data points, representing a plurality of enrollment speakers, into a data structure using high-dimensional vectors that represent characteristics of enrollment voice samples from enrollment speakers;
  means for estimating a density of a subset of the plurality of speaker data points using Parzen windows, wherein the subset comprises the approximate nearest neighbors to an unidentified voice sample from an unidentified speaker, the subset not including all speaker data points in the plurality of speaker data points, wherein the relative contributions to the density of individual speaker data points within the subset of speaker data points is based on a distance to a speaker data point from the unidentified speaker data point, wherein the relative contributions of speaker data points at closer distances are greater than the relative contributions of speaker data points at further distances; and
  means for identifying the unidentified speaker based on one or more speaker data points most closely matching the unidentified voice sample as indicated by the estimated density.

15. The system of claim 14, wherein the means for estimating estimates the density based on a distance between individual speaker data points within the subset of speaker data points.

16. The system of claim 14, wherein the means for estimating estimates the density of the subset of speaker data points independent of parametric distribution information related to the plurality of speaker data points.

17. The system of claim 14, wherein the means for organizing organizes the plurality of speaker data points such that a distance between individual speaker data points is based on characteristic similarities between associated voice samples, the distance measured in terms of one from the group containing: a Euclidean distance, a Minkowski distance, and a Manhattan distance.

18. The system of claim 14, wherein the means for organizing comprises a kd-tree.

19. The system of claim 14, wherein the plurality of speaker data points comprises a relatively large number of speaker data points.

20. The system of claim 14, further comprising means for retrieving the subset of speaker data points uses an unidentified speaker data point from the unidentified voice sample as an index into the plurality of speaker data points.

21. The system of claim 20, wherein the means for retrieving the subset of speaker data points retrieves approximate nearest neighbors to the unidentified speaker data point, the approximate nearest neighbors comprising speaker data points within a distance calculated as a function of a distance of an absolute nearest neighbor.

22. The system of claim 14, wherein the subset of speaker data points includes more than one speaker data points associated with a common identification, and the identification module accumulates a score for the common identification.

23. The system of claim 14, further comprising a means for extracting the high-dimensional vectors from voice samples.

24. The system of claim 14, wherein the means for identifying identifies the unidentified speaker as one of the enrollment speakers if matching is within an error threshold.

25. The system of claim 14, wherein an enrollment voice sample and the unidentified voice sample of a common speaker are text-independent.

26. A computer program product, comprising:
  a computer-readable medium having computer program instructions and data embodied thereon for voice recognition, comprising the steps of:
    organizing a plurality of speaker data points, representing a plurality of enrollment speakers, into a data structure using high-dimensional vectors that represent characteristics of enrollment voice samples from the enrollment speakers;
    estimating a probability density of a subset of the plurality of speaker data points using Parzen windows, wherein the subset comprises the approximate nearest neighbors to an unidentified voice sample from an unidentified speaker, the subset not including all speaker data points in the plurality of speaker data points, wherein the relative contributions to the density of individual speaker data points within the subset of speaker data points is based on a distance to a speaker data point from the unidentified voice sample, wherein the relative contributions of speaker data points at closer distances are greater than the relative contributions of speaker data points at further distances; and
    identifying the unidentified speaker based on one or more speaker data points most closely matching the unidentified voice sample as indicated by the estimated density.

27. The computer program product of claim 26, wherein the step of estimating the probability density comprises estimating the density based on a distance between individual speaker data points within the subset of speaker data points.

28. The computer program product of claim 26, wherein the step of estimating the probability density comprises estimating the probability density function of the subset of speaker data points independent of parametric distribution information related to the plurality of speaker data points.

29. The computer program product of claim 26, wherein the data structure module organizes the plurality of speaker data points such that a distance between individual speaker data points is based on characteristic similarities between associated voice samples, the distance measured in terms of one from the group containing: a Euclidean distance, a Minkowski distance, and a Manhattan distance.

30. The computer program product of claim 26, wherein the data structure comprises a kd-tree.

31. The computer program product of claim 26, wherein the plurality of speaker data points comprises a relatively large number of speaker data points.

32. The computer program product of claim 26, further comprising a step of retrieving the subset of speaker data points using an unidentified speaker data point from the unidentified voice sample as an index into the plurality of speaker data points.

33. The computer program product of claim 31, wherein the step of retrieving the subset of speaker data points comprises retrieving approximate nearest neighbors to the unidentified speaker data point, the approximate nearest neighbors comprising speaker data points within a distance calculated as a function of a distance of an absolute nearest neighbor.

34. The computer program product of claim 26, wherein the subset of speaker data points includes more than one speaker data points associated with a common identification, and the identification module accumulates a score for the common identification.

35. The computer program product of claim 26, further comprising extracting the high-dimensional vectors from the enrollment voice samples and the unidentified voice sample.

36. The computer program product of claim 26, wherein the step of identifying the unidentified speaker comprises identifying the unidentified speaker as one of the enrollment speakers if matching is within an error threshold.

37. The computer program product of claim 26, wherein an enrollment voice sample and the unidentified voice sample of a common speaker are text-independent.

* * * * *

UNITED STATES PATENT AND TRADEMARK OFFICE
CERTIFICATE OF CORRECTION

PATENT NO.        : 7,475,013 B2
APPLICATION NO.   : 10/810232
DATED             : January 6, 2009
INVENTOR(S)       : Ryan Rifkin It is certified that error appears in the above-identified patent and that said Letters Patent is hereby corrected as shown below:

Column 9, line 59; after "speaker data," insert -- point --

Column 12, line 11; after "density," insert -- function --

Column 12, line 29; after "mated," insert -- probability --

Column 12, line 29; after "density," insert -- function --

Signed and Sealed this

Thirty-first Day of March, 2009

JOHN DOLL
*Acting Director of the United States Patent and Trademark Office*